(12) United States Patent
Jung et al.

(10) Patent No.: US 11,945,397 B2
(45) Date of Patent: Apr. 2, 2024

(54) ASSEMBLY GROUP CONSISTING OF A CAP OF A TUBULAR GAS GENERATOR AND A DEFLECTOR ELEMENT, TUBULAR GAS GENERATOR AND METHOD FOR MANUFACTURING A TUBULAR GAS GENERATOR

(71) Applicant: ZF Airbag Germany GmbH, Aschau a. Inn (DE)

(72) Inventors: Christian Jung, Mühldorf (DE); Thomas Kapfelsperger, Mühldorf (DE); Michael Schmökel, Burghausen (DE)

(73) Assignee: ZF Airbag Germany GmbH, Aschau a. Inn (DE)

( * ) Notice: Subject to any disclaimer, the term of this patent is extended or adjusted under 35 U.S.C. 154(b) by 142 days.

(21) Appl. No.: 17/638,449

(22) PCT Filed: Jul. 29, 2020

(86) PCT No.: PCT/EP2020/071389
§ 371 (c)(1),
(2) Date: Feb. 25, 2022

(87) PCT Pub. No.: WO2021/037468
PCT Pub. Date: Mar. 4, 2021

(65) Prior Publication Data
US 2022/0340100 A1    Oct. 27, 2022

(30) Foreign Application Priority Data
Aug. 27, 2019    (DE) .......................... 102019122992.8

(51) Int. Cl.
*B60R 21/261*    (2011.01)
*B60R 21/217*    (2011.01)
(Continued)

(52) U.S. Cl.
CPC ........ *B60R 21/262* (2013.01); *B60R 21/2171* (2013.01); *B60R 21/261* (2013.01);
(Continued)

(58) Field of Classification Search
CPC ... B60R 21/217; B60R 21/2171; B60R 21/26; B60R 21/261; B60R 21/262;
(Continued)

(56) References Cited

U.S. PATENT DOCUMENTS 4,021,058 A * 5/1977 Suzuki .................. B60R 21/261
                                                        137/71
4,084,839 A * 4/1978 Takagi .................... B60R 21/26
                                                        280/736

(Continued)

FOREIGN PATENT DOCUMENTS

DE        20003652 U1 *  4/2000    ............. B60R 21/30
DE        19957578 A1 *  5/2001    ......... B60R 21/2171
(Continued)

OTHER PUBLICATIONS

International Search Report and Written Opinion for PCT/EP2020/071389 dated Sep. 10, 2020 (10 pages; with English translation).

*Primary Examiner* — Barry Gooden, Jr.
(74) *Attorney, Agent, or Firm* — Kristin L. Murphy

(57) ABSTRACT

In an assembly group comprising a cap of a tubular gas generator and a deflector element that deflects gas flowing out of at least one outflow opening of the cap to at least one discharge opening of the deflector element, a deflection surface of the deflector element is arranged radially outwardly of the outflow opening. At least two securing arms of the deflector element extend through the outflow opening and engage behind an edge defining the outflow opening on an inside in a positive connection with the cap. The cap is fixed firmly to an axial end of the tubular gas generator.

(Continued)

Subsequently, the deflector element is slid from an outside of the cap with its securing arms through the outflow opening, the securing arms forming a positive connection with the edge of the outflow opening which fixes the deflector element firmly to the cap.

20 Claims, 5 Drawing Sheets

(51) Int. Cl.
*B60R 21/262* (2011.01)
*B60R 21/264* (2006.01)
*B60R 21/26* (2011.01)

(52) U.S. Cl.
CPC ... *B60R 21/264* (2013.01); *B60R 2021/26011* (2013.01); *B60R 2021/2615* (2013.01)

(58) Field of Classification Search
CPC .... B60R 2021/2612; B60R 2021/2615; B60R 2021/2617
See application file for complete search history.

(56) References Cited

U.S. PATENT DOCUMENTS

| | | | | |
|---|---|---|---|---|
| 5,658,008 A * | 8/1997 | Herrmann | B60R 21/217 | 280/728.2 |
| 5,988,677 A * | 11/1999 | Adomeit | B60R 21/261 | 280/736 |
| 6,022,043 A * | 2/2000 | Harnisch | B60R 21/205 | 280/732 |
| 6,109,649 A * | 8/2000 | Adomeit | B60R 21/233 | 280/740 |
| 6,325,409 B1 * | 12/2001 | Fischer | B60R 21/213 | 280/730.2 |
| 6,328,332 B1 * | 12/2001 | Schutz | B60R 21/217 | 280/741 |
| 6,474,680 B1 * | 11/2002 | Miyahara | B60R 21/213 | 280/736 |
| 7,644,950 B2 * | 1/2010 | Kloss | B60R 21/261 | 280/740 |
| 2002/0008373 A1 * | 1/2002 | Specht | B60R 21/213 | 280/741 |
| 2002/0105175 A1 * | 8/2002 | Lewis | B60R 21/18 | 280/733 |
| 2003/0001371 A1 * | 1/2003 | Wackenroder | B60R 21/26 | 280/742 |
| 2003/0094798 A1 * | 5/2003 | Ogata | B60R 21/26 | 280/730.2 |
| 2003/0111832 A1 * | 6/2003 | Kelley | B60R 21/261 | 280/736 |
| 2003/0178829 A1 * | 9/2003 | Dinsdale | B60R 21/232 | 280/741 |
| 2004/0026910 A1 * | 2/2004 | Englbrecht | B01J 4/001 | 280/736 |
| 2004/0140655 A1 * | 7/2004 | Henning | B60R 21/26 | 280/736 |
| 2004/0232664 A1 * | 11/2004 | Tokunaga | B60R 21/26 | 280/730.2 |
| 2004/0232675 A1 * | 11/2004 | Marotzke | B60R 21/276 | 280/739 |
| 2005/0062272 A1 * | 3/2005 | Smith | B60R 21/26 | 280/741 |
| 2005/0121883 A1 * | 6/2005 | Joos | B60R 21/201 | 280/728.2 |
| 2005/0156419 A1 * | 7/2005 | Gabler | B60R 21/261 | 280/740 |
| 2005/0161927 A1 * | 7/2005 | Yokoyama | B60R 21/23138 | 280/743.1 |
| 2005/0189739 A1 * | 9/2005 | DePottey | B60R 21/261 | 280/740 |
| 2005/0248134 A1 * | 11/2005 | Heigl | B60R 21/261 | 280/730.2 |
| 2006/0103119 A1 * | 5/2006 | Kurimoto | B60R 21/233 | 280/730.2 |
| 2006/0261582 A1 * | 11/2006 | Fischer | B60R 21/261 | 280/736 |
| 2007/0063489 A1 * | 3/2007 | Dinsdale | B60R 21/261 | 280/728.2 |
| 2007/0200327 A1 * | 8/2007 | Kloss | B60R 21/261 | 280/740 |
| 2007/0257475 A1 | 11/2007 | Fukuda et al. | | |
| 2007/0262573 A1 * | 11/2007 | Faeth | B62D 1/16 | 280/736 |
| 2008/0054610 A1 * | 3/2008 | Heigl | B60R 21/261 | 280/736 |
| 2008/0136154 A1 * | 6/2008 | Lindqvist | B60R 21/26 | 280/741 |
| 2011/0316264 A1 * | 12/2011 | Maruyama | B60R 21/2171 | 280/730.2 |
| 2012/0248747 A1 * | 10/2012 | Sugimoto | B60R 21/207 | 280/729 |
| 2013/0048760 A1 * | 2/2013 | Iwakiri | B60R 21/2171 | 239/569 |
| 2013/0161946 A1 * | 6/2013 | Baumgartner | B60R 21/2171 | 285/402 |
| 2017/0036640 A1 * | 2/2017 | Tonooka | B60R 21/2171 | |
| 2019/0143927 A1 * | 5/2019 | Casal Alonso | B60R 21/2037 | 280/731 |
| 2021/0009075 A1 * | 1/2021 | Schoenborn | B01D 46/2403 | |
| 2022/0001826 A1 * | 1/2022 | Disam | B60R 21/262 | |
| 2022/0266788 A1 * | 8/2022 | Weber | B60R 21/261 | |
| 2022/0274557 A1 * | 9/2022 | Disam | B60R 21/261 | |
| 2022/0332273 A1 * | 10/2022 | Fischer | B60R 21/2171 | |

FOREIGN PATENT DOCUMENTS

| | | | |
|---|---|---|---|
| DE | 20210948 U1 | 1/2003 | |
| DE | 10318133 A1 | 10/2003 | |
| DE | 10222085 A1 * | 12/2003 | ............. B60R 21/26 |
| DE | 10236905 A1 * | 2/2004 | ............. B60R 21/26 |
| DE | 20215541 U1 | 3/2004 | |
| DE | 10358057 A1 * | 7/2004 | ............. B60R 21/26 |
| DE | 102004005555 A1 * | 9/2005 | ............. B60R 21/26 |
| DE | 102006048525 A1 * | 5/2007 | ........... B60R 21/217 |
| DE | 102006041611 A1 | 3/2008 | |
| DE | 102008029903 A1 * | 12/2009 | ............. B60R 21/26 |
| DE | 102008063789 A1 | 7/2010 | |
| DE | 102020115988 A1 * | 1/2021 | ......... B01D 46/0039 |
| EP | 1167130 A1 * | 1/2002 | ............. B60R 21/26 |
| EP | 1775178 A2 * | 4/2007 | ........ B60N 2/42763 |
| GB | 2399548 A * | 9/2004 | ............. B60R 21/26 |
| GB | 2406312 A | 3/2005 | |
| JP | 2008080909 A | 4/2008 | |
| WO | WO-03078215 A1 * | 9/2003 | ............. B60R 21/26 |
| WO | WO-2004045922 A1 * | 6/2004 | ............. B60R 21/26 |

* cited by examiner

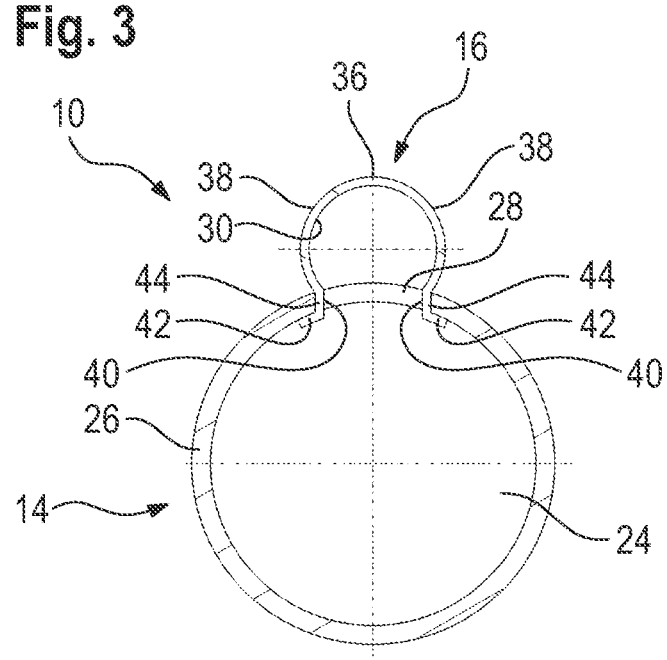
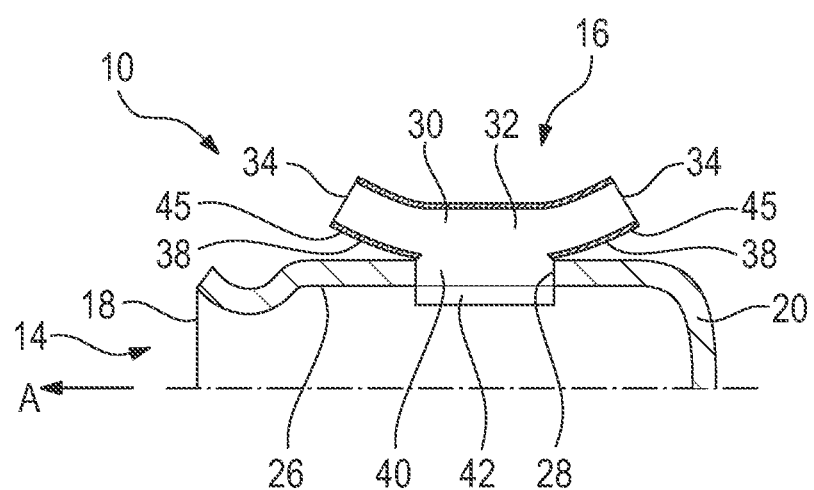

ASSEMBLY GROUP CONSISTING OF A CAP OF A TUBULAR GAS GENERATOR AND A DEFLECTOR ELEMENT, TUBULAR GAS GENERATOR AND METHOD FOR MANUFACTURING A TUBULAR GAS GENERATOR

CROSS-REFERENCE TO RELATED APPLICATIONS

This application is a national stage of International Application No. PCT/EP2020/071389, filed Jul. 29, 2020, the disclosure of which is incorporated herein by reference in its entirety, and which claimed priority to German Patent Application No. 102019122992.8, filed Aug. 27, 2019, the disclosure of which is incorporated herein by reference in its entirety.

TECHNICAL FIELD

The disclosure relates to an assembly group that includes a cap of a gas generator and a deflector element, as well as to a gas generator and to a method for manufacturing a gas generator.

BACKGROUND

In elongate gas generators, also referred to as tubular gas generators, gas generated upon activation leaves the gas generator through an outflow region comprising one or more gas outlet openings. The outflow region is frequently provided at an axial end of the tubular gas generator.

In a possible variant, the outflow region is formed directly in an outer wall of the gas generator.

It is also known to realize the outflow region alternatively by a diffusor firmly mounted on an axial end of the gas generator, the diffusor including a plurality of gas outlet openings in its peripheral wall. The diffusor is regarded as a constituent of the gas generator in this variant.

The gas outlet openings are usually spread evenly over the circumference of the diffusor or the gas generator to maintain the gas generator thrust-neutral upon activation thereof, with the gas usually flowing off in the radial direction.

In a lot of airbag modules, the tubular gas generator is arranged so that its outflow region is located inside the inflatable volume of an airbag. This design is found, for example, in curtain-like side airbags or else in side airbags which are installed in a backrest of a vehicle seat.

However, frequently a radial gas discharge is a drawback, as a specific filling of individual airbags or individual chambers of an airbag is impeded hereby. It is also difficult to divide the gas exiting the tubular gas generator into plural gas flows.

In this context, it is known, for example, to provide a specific fabric layer that surrounds the outflow region of the tubular gas generator in the circumferential direction and that protects the airbag fabric from the exiting gas as well as deflects the gas flow in the axial direction. A specific division of the gas flow is not possible, however, by virtue of the flexibility of the fabric layer.

It is also known to provide a so-called gas lance which has a tubular piece open at both ends and which is axially attached to a tubular gas generator to transfer the exiting gas over a distance of several decimeters to an airbag disposed at a distance from the tubular gas generator. Although a directed gas flow into the airbag can be generated in this way, it is not possible, however, to dispose the outflow region of the tubular gas generator directly on or inside the airbag, which inevitably increases the dimension of the airbag module.

Moreover, for the use in different airbag modules, the entire gas routing must always be adapted in a complicated manner.

SUMMARY

What is needed is a flexible option to guide the gas flowing out of the tubular gas generator to its point of use, while providing a small size, proper possibilities of adaptation to different geometries and at low manufacturing costs, as well as with the option to divide the gas flow into plural gas flows.

An assembly group is proposed herein that comprises a cap of a tubular gas generator and a deflector element that deflects gas flowing out of at least one outflow opening of the cap to at least one discharge opening of the deflector element, and a deflection surface of the deflector element being arranged radially outwards of the outflow opening. At least two securing arms of the deflector element extend through the outflow opening and engage behind an edge defining the outflow opening on an inside in a positive connection with the cap.

It is possible via the deflector element to deflect the gas radially flowing out of the tubular gas generator to a different direction, in particular along an axial direction of the tubular gas generator, which is more favorable for plural applications. For example, the assembly can be used for a tubular gas generator of a side airbag module including a curtain-like side airbag in which gentler gas introduction is possible by deflection of the gas by the deflector element.

When the deflector element includes plural discharge openings, also a division of the gas exiting the tubular gas generator into plural gas flows possibly comprising different amounts of gas can be easily achieved to fill plural chambers of an airbag, for example.

In case the tubular gas generator includes a diffusor, the cap should be arranged at an axial end of the tubular gas generator at which also the diffusor is provided, wherein the cap usually covers the diffusor completely in the axial direction and in a circumferential direction and/or surrounds the same at a distance.

However, it is not mandatory to provide, in addition to the assembly group according to the invention, a separate diffusor, for the assembly group per se can adopt the function of gas discharge from the tubular gas generator and, in so doing, can replace the actual diffusor. In such a case without a diffusor, the cap should be arranged, as a matter of course, at the axial end of the tubular gas generator out of which gas can flow.

In one exemplary arrangement, the cap is a component initially separate from the tubular gas generator and is manufactured separately therefrom. In one exemplary arrangement, the cap is constructed as a one-piece component.

In one exemplary arrangement, the deflector element is manufactured separately from the cap and initially is a component separate therefrom. In on exemplary arrangement, the deflector element is constructed as a one piece element.

In one exemplary arrangement, the cap may be constructed to be tube-shaped with an open end that is slid over the axial end of the tubular gas generator or over the diffusor of the tubular gas generator and is firmly fixed to the tubular gas generator. The opposite end of the cap is sealed in a gas-tight manner so that, when the tubular gas generator is activated, the gas exiting the latter advantageously flows exclusively through the discharge opening(s) of the cap and the deflector element to the environment of the tubular gas generator, such as into an airbag.

The terms axial direction and radial direction in this application always refer to a longitudinal axis of the tubular gas generator that coincides with the longitudinal axis of the cap when the latter is mounted on the tubular gas generator.

In one exemplary arrangement, the deflection surface of the deflector element advantageously covers the outflow opening of the cap completely so as to deflect the whole gas exiting the outflow opening to a desired direction.

It has shown that, apart from the positive connection by engaging behind the edge of the outflow opening, no additional fixation of the deflector element on the cap is required. The deflector element can be arranged quickly and, thus, cost-efficiently to the cap. It is imaginable, of course, to provide an additional fixation, such as by gluing or welding.

In one exemplary arrangement, the outflow opening includes a rectangular surface and is slit-shaped. In this case, the securing arms act on opposite edge portions located at long sides of the outflow opening.

The securing arms may be arranged, with respect to a longitudinal extension of the deflector element, approximately in the middle of the deflector element to obtain a uniform load of the securing arms, when the tubular gas generator is activated.

In one exemplary arrangement, the securing arms extend at opposite sides of the deflection surface.

In one exemplary arrangement, the free ends of the securing arms are bent and are adjacent to the edge of the outflow opening, in one exemplary arrangement, at opposite edge portions of the outflow opening, on an inner face of a wall of the cap.

The positive connection may be simple engagement behind an edge of the outflow opening of the cap, but also a click-lock or a bayonet lock. The bent free ends of the securing arms then form stop elements or the elements of the bayonet lock, for example.

If the deflector element is elastically deformable transversely to its longitudinal extension, it can be mounted easily from outside on the outflow opening by compressing the securing arms by a mounting force and sliding them through the outflow opening into an interior of the cap. The form fit with the edge of the outflow opening is then produced by the securing arms springing apart, when the mounting force is dropped or removed.

In order to achieve a proper connection between the deflector element and the cap and to produce sufficient gas tightness between the deflector element and the cap, in this variant the securing arms may extend over 50% or more of the length of the deflector element along the longitudinal direction of the cap. In one exemplary arrangement, along the axial direction, the securing arms are as long as the outflow opening.

If the deflector element is to be fixed by a bayonet lock, it need not significantly be elastically deformable. However, an elastic deformability of the securing arms is favorable for the generation of bias.

It is of advantage in this case that for assembly, no temporary mechanical deformation, such as elastic deformation of the securing arms, has to be performed on the deflector element. Thus, cheaper materials such as a more thin-walled material, for example, can be used for the deflector element.

In this case, too, the deflector element can be mounted from outside, however, by sliding the securing arms in a first orientation through the outflow opening and subsequently providing the form fit by rotation of the deflector element.

In this case, the securing arms should be selected to be shorter in the longitudinal direction of the cap. They can extend, for example, over 25% or less of the length of the deflector element along the longitudinal direction of the cap. Advantageously, in a rectangular outflow opening, the securing arms are narrower than the short side of the outflow opening so that the deflector element can be inserted into the outflow opening in a rotated orientation.

Since the deflector element can be mounted from outside through the outflow opening of the cap, it is possible to fix the cap without the deflector element to the tubular gas generator first and insert the deflector element into the cap only after this step. This permits inexpensive mounting of the cap on the tubular gas generator by roller-burnishing, for example.

In one exemplary arrangement, the deflecting surface of the deflector element is arc-shaped or groove-shaped and may be curved concavely toward the cap. In one exemplary arrangement, the deflector element encloses a cavity between the outside of the cap and the inside of the deflection surface into which cavity the gas exiting the outflow opening flows. The gas is directed to leave, when the tubular gas generator is activated, the deflector element through the provided discharge opening(s) only.

In one exemplary arrangement, lateral surfaces of the deflection surface extend on both sides of a crown line of the deflection surface, the crown line in the mounted state extending in the axial direction of the cap. The crown line is the portion of the deflector element most distant from the central axis of the cap, for example.

In one exemplary arrangement, the lateral surfaces merge into the securing arms, wherein it is advantageous for producing a bias when the curvature of the outer surface of the deflector element does not change when the respective lateral surface merges into the securing arm.

In one exemplary arrangement, the deflector element includes a formed sheet metal and can be made from a one-piece sheet metal blank, for example, and in exemplary arrangement, from a spring steel.

The blank comprises the deflection surface and the securing arms, the deflection surface being formed by a rectangular portion of the blank and the securing arms projecting from opposite sides of the rectangular portion.

The later crown line of the deflection surface then extends centrally between the two long sides of the rectangular portion.

When forming the blank, the lateral surfaces can be bent toward each other on both sides of the crown line. In this case, at least one securing arm extends perpendicularly to the crown line from each of the long sides of the lateral surfaces. When the lateral surfaces are bent around the crown line, the securing arms move to a position at which they are approximately in parallel to each other.

The two lateral surfaces and/or the securing arms are, e.g., elastically deformable so that a resilient bias can be caused which biases the two lateral surfaces outwards.

In the state in which the deflector element is mounted on the cap, said bias ensures the form fit between the securing arms and the edge of the outflow opening to be maintained and the securing arms to be biased and urged against the edges of the outflow opening.

In a cross-section perpendicular to the longitudinal direction of the cap in a mounted state level with the securing arms, the deflector element may be approximately horseshoe-shaped, for example.

The deflector element is mounted in the simplest way when the area of the outflow opening is rectangular. On principle, the outflow opening may have any suitable cross-section, however.

In a rectangular or slit-shaped outlet opening, the securing arms of the deflector element act upon opposite edge portions of the long sides so as to obtain a uniform fastening force.

In one exemplary arrangement, it may be advantageous for the securing arms to urge away from each other against the edge of the outflow opening when the deflector element is mounted on the cap.

Both the cap and the deflector element are made from a suitable metal, for example, wherein generally the wall thickness of the deflector element may be smaller than the cap.

In one exemplary arrangement, the deflector element has an elongate shape and is open at both of its axial ends so that a discharge opening is formed at each axial end.

This geometry is useful, for example, to supply two separate chambers of one airbag or else two separate airbags via the tubular gas generator with filling gas or to inflate the airbag in opposite directions.

In one exemplary arrangement, the deflection surface extends along the longitudinal direction on both sides beyond the securing arms to improve the gas guidance.

In this case, the discharge openings simply result from the short sides of the lateral surfaces each of which is curved at the axial end of the deflector element.

When the deflector element is mounted on the cap, in one exemplary arrangement the free edges of the lateral surfaces are adjacent to the circumferential wall of the cap and thus seal the cavity between the outside of the cap and the inside of the deflection surface against the cap.

In another exemplary arrangement, the free edges of the lateral surfaces are bent toward each other and form tubes which guide the gas from the outflow opening to a respective one of the discharge openings.

A cavity formed between the deflector element and the cap in these cases defines a tube which is opened toward the environment of the tubular gas generator at the axial ends only, the cavity being connected to an interior of the cap via the outflow opening.

The discharge openings may be equally sized and may be directed in opposite directions so that the tubular gas generator is maintained to be thrust-neutral.

The orientation of the discharge opening can also be varied, however, and can be adapted to the desired direction of the exiting gas flow.

It is also imaginable to select the cross-sectional areas of the two discharge openings to be different so as to realize gas flows with different amounts of gas, such as, for example, at a 60/40 ratio or a 70/30 ratio.

Optionally, a filter is arranged between the outflow opening of the cap and the at least one discharge opening of the deflector element. The outflowing gas flows through said filter which can withhold particles and/or cool the outflowing gas, for example. The filter may serve for re-filtering of the gas, but it might also be used as a substitute for a filter in the diffusor of the tubular gas generator or in the tubular gas generator itself.

The filter can comprise a knitted mesh or a screen in a known way.

For assembly, the filter can be inserted into the deflector element, before the latter is assembled, or can be inserted, after assembling the deflector element on the cap, into the deflector element along the longitudinal direction through the discharge opening. The filter is optionally held at the desired position via tabs at its longitudinal ends.

In one possible exemplary arrangement, two outflow openings separated from each other by a central web are provided in the circumferential wall of the cap, and the deflector element includes at least four securing arms, two adjacent securing arms acting on both sides of the central web upon the edge of each of the outflow openings. In this way, the total surface area of the outflow openings can be enlarged without substantially losing stability, as the central web can act as a tie rod for the edges of the outflow openings when the tubular gas generator is activated.

A tubular gas generator is also provided that includes, at an axial end, at least one gas outlet opening and that is provided with an assembly group as described in the foregoing. The cap is fixed to the tubular gas generator and encompasses the axial end thereof. A collecting chamber is formed between the at least one gas outlet opening and the cap through which the gas flows to the deflector element when the tubular gas generator is activated. The at least one gas outlet opening may be the open axial end of the tubular gas generator itself or may constitute the corresponding opening resulting from an open tube at said end. However, the at least one gas outlet opening can also be introduced to or arranged on the circumferential wall of the outer housing of the tubular gas generator at said end.

At the axial end of the tubular gas generator, also a thrust-neutral diffusor having numerous gas outlet openings is arranged at a circumferential wall of the tubular gas generator or at the axial end thereof, if required, and can be understood as a kind of axial extension of the tubular gas generator. Accordingly, based on the radial direction, the diffusor is located between the tubular gas generator and the cap.

Accordingly, the circumferential wall can be regarded, if it has one or more gas outlet openings, as belonging either to the outer housing of the gas generator itself or to the diffusor.

Moreover, a method for manufacturing a tubular gas generator is also described herein. The method comprises the following steps: a cap is firmly fixed to an axial end of a tubular gas generator. Subsequently, a deflector element is slid from an outer face of the cap with its securing arms through an outflow opening, the securing arms forming a positive connection with an edge of the outflow opening which fixes the deflector element firmly to the cap.

This manufacturing method allows for initially fastening the cap to the tubular gas generator, which can be carried out at low cost by roller-burnishing in a rotationally symmetric cap, for example. Of course, different types of fastening, such as crimping, flaring or welding, are also possible.

In one exemplary arrangement, the deflector element is inserted only later, wherein it is fixed to the cap by a positive connection only so that time-consuming and inexpensive methods such as soldering or welding can be dispensed with.

It is another advantage that only one single geometry, which is suited for a specific tubular gas generator, has to be provided for the cap. An adaptation to different applications, such as for different airbag modules, can be achieved simply by using different deflector elements which must merely include suitable securing arms for engaging in the outflow opening of the cap, but concerning the geometry of the deflecting surface and the discharge openings can be easily adapted to different applications.

The deflector element is inserted, for example, by the securing arms being moved toward each other and being elastically deformed by application of force and, after stopping the application of force, the securing arms springing apart from each other again.

For mounting the deflector element to the cap, in this case two lateral surfaces are urged toward each other by a mounting force until the securing arms can be inserted from the outside of the cap through the outflow opening. Accordingly, the deflector element is elastically deformed. Said bias ensures, when the mounting force subsides, the lateral surfaces and the securing arms to brace apart again, wherein the bent free ends of the securing arms engage behind the edge of the outflow opening.

In the variant in which the form fit of the securing arms with the edge of the outflow opening is obtained by a bayonet lock, the securing arms are inserted in a first orientation into the outflow opening and are then rotated by a predetermined angle into a second orientation while forming the bayonet lock. The rotation is advantageously performed perpendicularly to the surface area of the outflow opening, for example by about 90°. In so doing, the bent free ends of the securing arms positively engage behind the edge of the outflow opening. In this case, too, the bias of the deflector element can ensure that, in the mounted state, the two securing arms remain biased outwardly against the edge of the outflow opening but, in this configuration, bias is basically not required.

BRIEF DESCRIPTION OF DRAWINGS

In the following, the disclosure will be described in detail by with respect to the attached figures that depict multiple exemplary arrangements, wherein:

FIG. 3 shows a schematic cross-sectional view of the assembly group of FIG. 1;

FIG. 4 shows a schematic longitudinal section across an alternative exemplary arrangement of the assembly group of FIG. 1;

DETAILED DESCRIPTION

Figure 1:
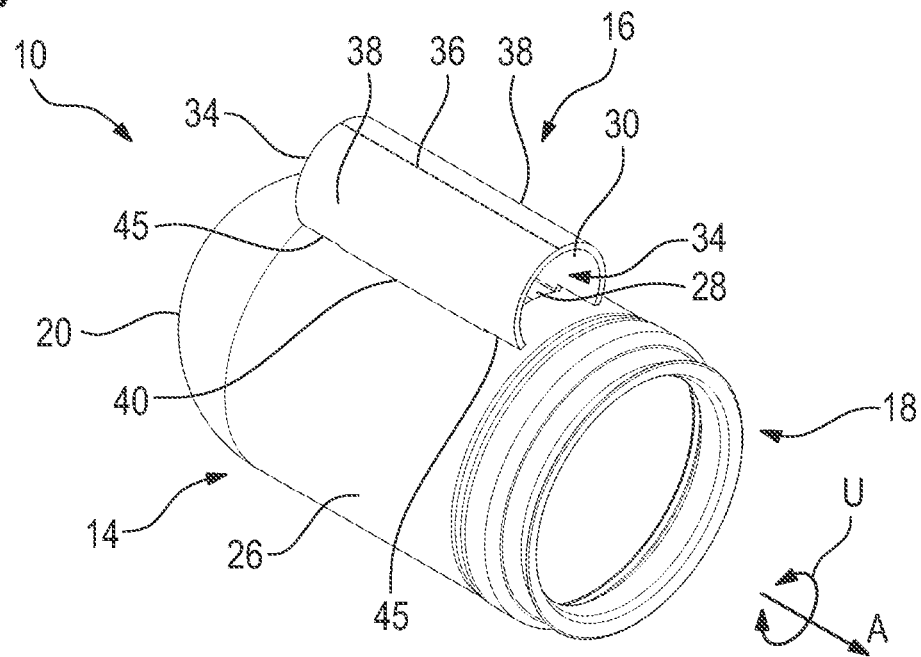
FIG. 1 shows a schematic perspective view of an assembly group according to the disclosure that comprises a cap and a deflector element according to a first exemplary arrangement, prior to assembly to a tubular gas generator.
Figure 2:
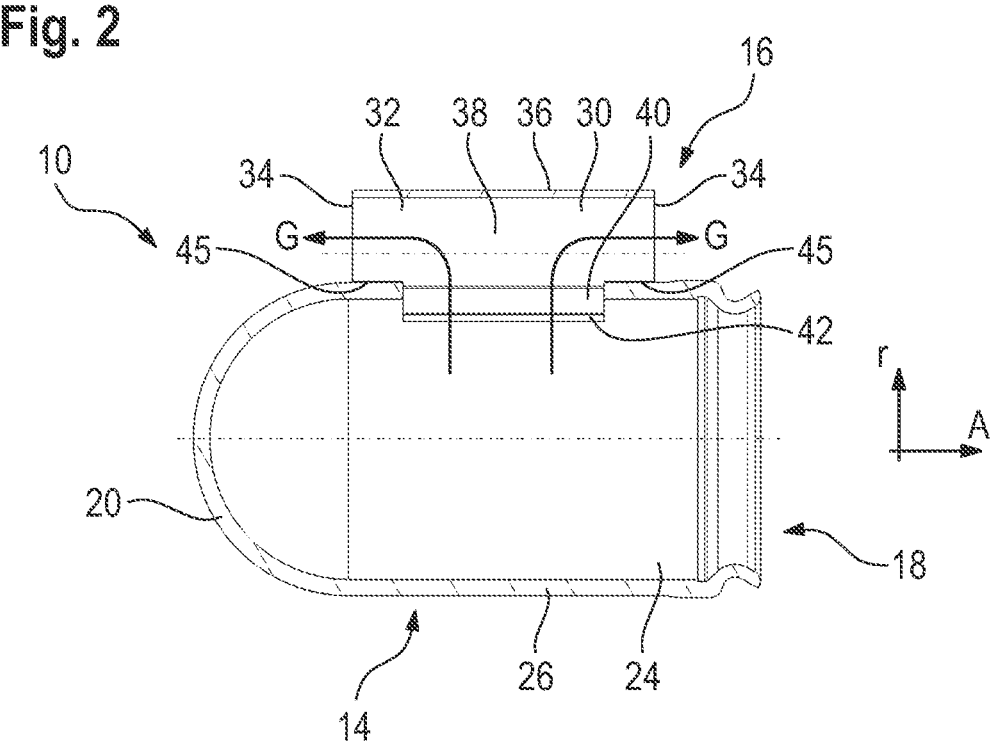
FIG. 2 shows a schematic longitudinal section across the assembly group of FIG. 1.
Figure 8:
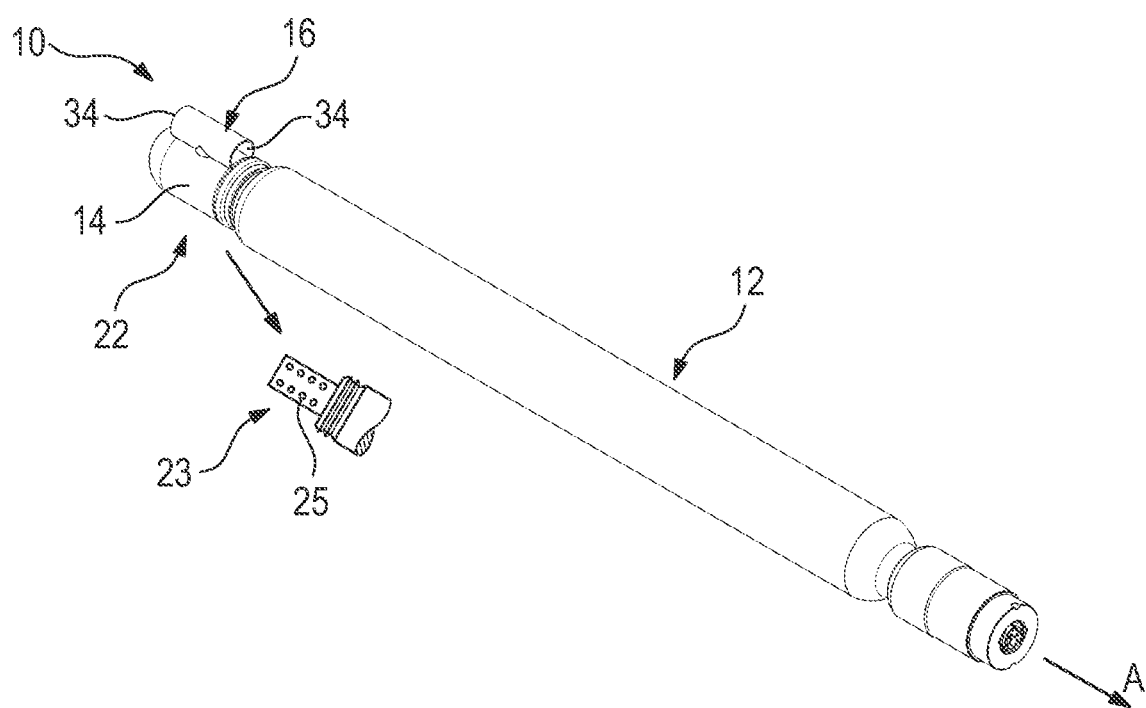
FIG. 8 shows a tubular gas generator according to the exemplary arrangement comprising an assembly group according to the disclosure mounted thereon and comprising a cap and a deflector element in a schematic perspective view.

FIGS. 1 to 3 illustrate an assembly group 10 for being mounted on a tubular gas generator 12 (see FIG. 8). The assembly group 10 in this exemplary arrangement comprises a cap 14 and a deflector element 16.

In the exemplary arrangement depicted, the cap 14 is a rotationally symmetric tubular component having an open end 18 and an, e.g., hemispherical closed end 20. The open end 18 is provided to be fixed to an axial end 22 of the tubular gas generator 12, such as to the circumferential wall thereof, in a firm and particularly gastight manner. This connection can be made by roller-burnishing, crimping, flaring or welding, for example.

At the axial end 22, the tubular gas generator 12 has a diffusor 23 separately plotted here having a plurality of gas outlet openings 25 distributed over the circumference thereof through which, upon activation, the gas exits the tubular gas generator 12, see FIG. 8. The diffusor 23 is firmly connected to the outer housing of the tubular gas generator 12 and forms a prefabricated unit with the tubular gas generator 12. The diffusor 23 can be considered virtually as a kind of axial extension of the tubular gas generator 12.

The cap 14 is slid over the axial end 22 of the tubular gas generator 12 so that the diffusor 23 is arranged in an interior 24 of the cap 14 at a distance from a wall, in this case a circumferential wall 26, and from the closed end 20 of the cap 14. Thus, a collecting chamber into which the gas exiting the diffusor 23 flows is formed between the outer side of the diffusor 23 and the inner side of the circumferential wall 26.

In a different variant, no diffusor is provided. In this case, the collecting chamber is formed directly between a circumferential wall of the tubular gas generator 12 in which at least one gas outlet opening 25 is provided, and the circumferential wall 26 of the cap 14. Then the assembly group 10 also adopts the function of a diffusor for directing and distributing the gas flowing out of the axial end 22 of the tubular gas generator 12. It is equally possible that the at least one gas outlet opening constitutes the open axial end 22 of the tubular gas generator 12 itself or the respective opening resulting from an open tube as outer housing at said end.

An outflow opening 28 is provided in the circumferential wall 26 of the cap 14. In the example of each of the FIGS. 1 to 3, the cap 14 has only one single outflow opening 28, but variants having plural outflow openings 28 are also conceivable (see also FIG. 7).

The outflow opening 28 in this case has a rectangular surface area, wherein the long sides of the rectangle are oriented in parallel to an axial direction A of the cap 14 which in the mounted state corresponds to the longitudinal direction of the tubular gas generator 12.

The cross-sectional area of the outflow opening 28 is selected to be so large that the gas flow exiting the tubular gas generator 12 can flow off through the outflow opening 28 without any significantly increased flow resistance.

The deflector element 16 includes a curved deflection surface 30 whose concave inner side faces the circumferential wall 26 of the cap 14 and the outflow opening 28 so that a tubular cavity 32 is formed between the deflection surface 30 and the outside of the circumferential wall 26.

The deflection surface 30 is located in a radial direction r outside the outflow opening 28 and, based on the axial direction A and the circumferential direction U, completely covers the same.

The deflector element 16 is open at both of its axial ends in this example so that a discharge opening 34 that is in direct fluid communication with the cavity 32 is formed at each axial end.

The deflection surface 30 in this case is oriented so that the tubular cavity 32 extends along the axial direction A.

A lateral surface 38 extending from a crown line 36 in the direction of the circumferential wall 26 of the cap 14 extends on both sides of a crown line 36 of the deflection surface 30.

When viewed perpendicularly to the crown line 36, along the axial direction A each of the lateral surfaces 38 merges in a central portion into a securing arm 40 which serves for fixation of the deflector element 16 to the cap 14, see FIG. 3.

In the axial direction A, in this exemplary arrangement, each securing arm 40 extends in the middle of the deflection surface 30 and has a width of more than about 50% of the length of the deflection surface 30 in the axial direction A.

The entire deflector element 16 is bent in this case from an integral blank made of a sheet metal having proper resilience, such as a spring steel.

In one exemplary arrangement, the blank is made from a rectangular portion which later forms the deflection surface 30 and, at each lateral edge, an extension which later forms a securing arm 40, the long sides of the rectangular portion merging into the extensions. In the finished deflector element 16, the short sides form the axial ends of the deflector element 16 and delimit the discharge openings 34.

The free ends of the extensions are bent outwards and, in the finished deflector element 16, form bent free ends 42 of the securing arms 40 (see FIG. 3).

The rectangular portion is bent around the crown line 36 extending centrally between the long sides so that the bent deflecting surface 30 is formed. In so doing, the securing arms 40 are moved toward each other, until they are approximately in parallel to each other.

In a section transversely to the axial direction A level with the securing arms 40, the deflector element 16 thus is approximately horseshoe-shaped (see FIG. 3).

For mounting the deflector element 16 on the cap 14, the securing arms 40 and/or the lateral surfaces 38 are moved toward each other by applying a predetermined mounting force so that a distance between the bent free ends 42 of opposite securing arms 40 is reduced so far that both securing arms 40 can be slid from outside through the outflow opening 28. The lateral surfaces 38 and/or the securing arms 40 are under a bias acting away from each other.

The mounting force is then reversed, in particular by being continuously reduced, thus causing the bent free ends 42 of the securing arms 40 to brace apart and move away from each other again due to the bias, until they are urged against an edge 44 of the outflow opening 28, more precisely against two opposite edge portions of the edge 44. In so doing, the bent free ends 42 engage behind the edge 44 of the outflow opening 28 on the inner face of the circumferential wall 26 and lock the deflector element 16.

As the bent free ends 42 engage behind the edge 44 and possibly the securing arms 40 are adjacent to the edge 44 of the outflow opening 28, a form fit is formed between the deflector element 16 and the cap 14, the form fit holding the deflector element 16 firmly on the cap 14, even when the tubular gas generator 12 is activated and, accordingly, the internal pressure in the interior 24 is increased by the discharging gas flow.

In the example shown here, the securing arms 40 and, in particular, the bent free ends 42 in the axial direction A have the same dimension as the long side of the outflow opening 28 so that the bent free ends 42 are adjacent, in the axial direction A, to the edge 44 of the outflow opening 28 over the whole length of the respective edge portions.

An additional fixation of the deflector elements 16 on the cap 14 is not provided here.

It is also imaginable to design the bent free ends 42 of the securing arms 40 so that the form fit is made automatically by a click-lock, when the securing arms 40 are slid from outside through the outflow opening 28, wherein the edge 44 of the outflow opening 28 initially deflects the securing arms 40 inwards and the latter spring back again, when the bent free ends 42 have passed the edge 44 and then engage behind the inside of the edge 44 (not shown).

In this exemplary arrangement, in the mounted state the free edges 45 of the lateral surfaces on both sides of the securing arms 40 rest on the circumferential wall 26 of the cap 14 and, in this way, seal the cavity 32.

For mounting the assembly group 10 on the tubular gas generator 12, at first the cap 14 without the deflector element 16 is slid with the open end 18 over the diffusor at the axial end 22 of the tubular gas generator 12, and the open end 18 of the cap 14 is connected to an outer wall of the tubular gas generator 12 in a firm and particularly gastight manner. This is carried out by roller-burnishing, crimping, flaring or welding, for example.

After connecting the cap 14 firmly to the tubular gas generator 12, the deflector element 16 is inserted into the outflow opening 28, as described above.

When the tubular gas generator 12 is activated, the gas exits the gas outlet opening(s) 25 of the tubular gas generator 12 or the diffusor 23 thereof and flows into the interior 24 of the cap 14 and there via the collecting chamber through the outflow opening 28 of the cap 14 into the cavity 32 between the deflection surface 30 of the deflector element 16 and the circumferential wall 26 of the cap 14. The gas is deflected at the deflection surface 30 from the radial direction r to the axial direction A and leaves the assembly group 10 through the two discharge openings 34.

In the examples shown here, the gas generated by the tubular gas generator 12 flows exclusively through the two discharge openings 34 into the environment of the tubular gas generator 12. However, it is also conceivable to provide additional discharge openings in the deflector element 16 or in the cap 14. It is also possible to form only one single discharge opening in the deflector element 16.

Each of the discharge openings 34 may be connected, for example, to one single chamber of an airbag, or the entire deflector element 16 may be positioned inside one single inflatable chamber (not shown). Any other suitable application is also imaginable, of course.

In the just described exemplary arrangement, the discharge openings 34 are directed in the axial direction A.

FIG. 4 illustrates an exemplary arrangement in which the lateral surfaces 38 on both sides of the securing arms 40 are formed into a circumferentially closed tube, the free edges 45 contacting each other and the cavity 32 being convexly curved as a whole away from the circumferential wall 26. As a result, the two discharge openings 34 are inclined with respect to the axial direction A.

The configuration and arrangement of the cavity 32, the lateral surfaces 38 and the discharge openings 34 is at the skilled person's discretion and can be easily adapted to different applications.

Those exemplary arrangements can always be provided with identical securing arms 40 so that, even when different deflector elements 16 are used, always an identically formed cap 14 can be used.

In the previously described exemplary arrangements, both discharge openings 34 are selected to have an equal cross-sectional area so that each of the gas flows G outflowing there comprises the same amount of gas.

Figure 5:
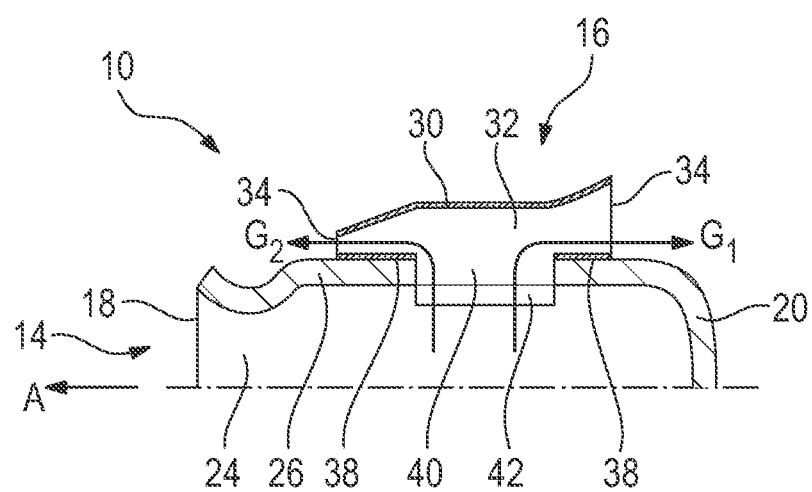
FIG. 5 shows a schematic longitudinal section across a further exemplary arrangement of the assembly group of FIG. 1.

FIG. 5 illustrates an exemplary arrangement in which the cross-sectional area of the discharge openings 34 is selected to be unequal so that gas flows $G_1$, $G_2$ with different amounts of gas result.

In one exemplary arrangement, the division may be selected at a 60/40 or 70/30 ratio, for example, or at any other ratio.

The cross-sectional shapes of the discharge openings 34 can be easily obtained by appropriately shaping the deflection surface 30 and, in particular, the lateral surfaces 38.

Figure 6:
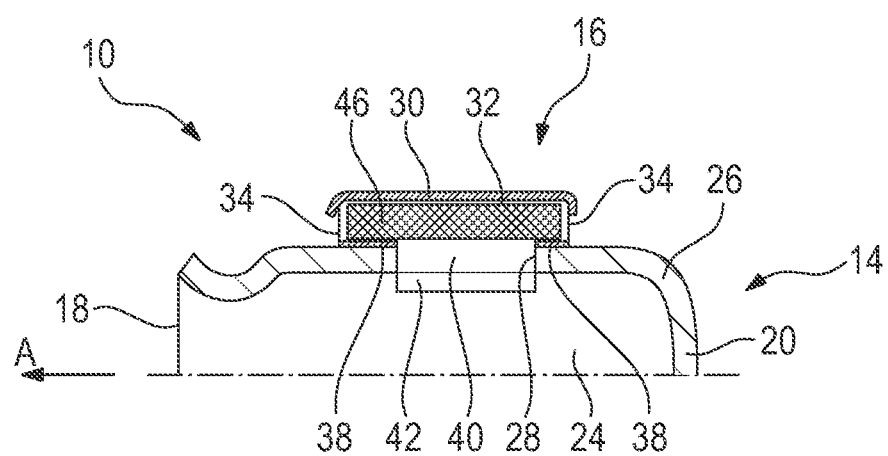
FIG. 6 shows a schematic longitudinal section across yet a further exemplary arrangement of the assembly group of FIG. 1.

FIG. 6 illustrates another variant in which a filter 46 that frees the gas flowing through the outflow opening 28 into the cavity 32 from particles or cools the gas, for example, is inserted in the cavity 32.

The filter 46 comprises a knitted mesh and/or screens made of a suitable metal in a known way, for example.

The filter 46 can be inserted into the cavity 32 either before mounting the deflector element 16 to the cap 14 or after mounting the deflector element 16.

Even in the exemplary arrangements according to FIGS. 5 and 6, the free edges 45 of the lateral surfaces 38 are bent toward each other in the axial direction A on both sides of the securing arms 40 so far that they contact each other so that the discharge openings 34 are formed by the ends of substantially circumferentially closed tubes.

Figure 7:
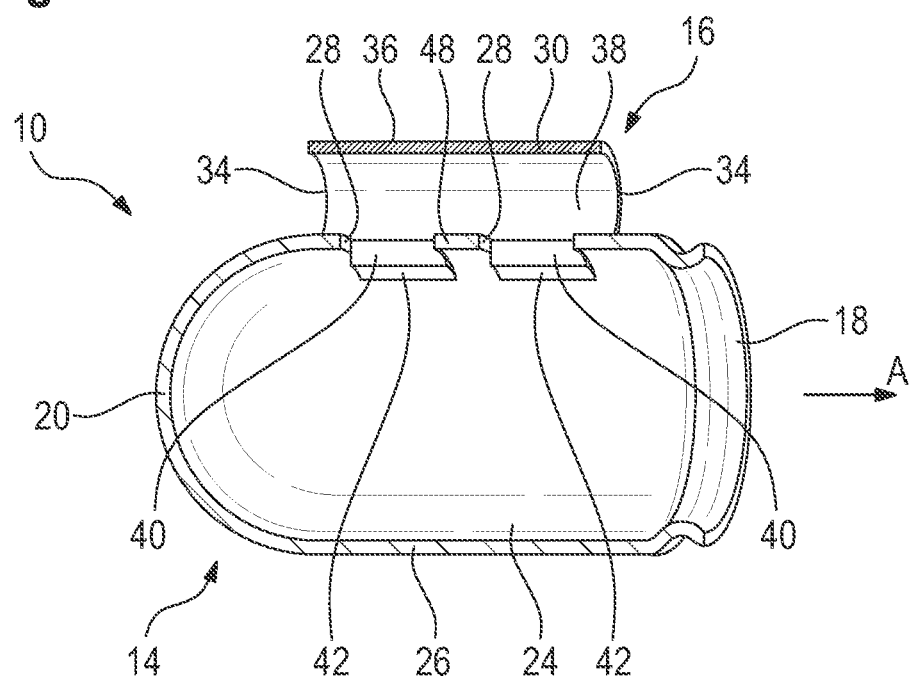
FIG. 7 shows a schematic longitudinal section across yet another exemplary arrangement of the assembly group of FIG. 1.

FIG. 7 shows a further variant in which two outflow openings 28 juxtaposed in the axial direction A are provided in the circumferential wall 26 of the cap 14 which are separated from each other by a central web 48.

The deflector element 16 in this case includes a total of four securing arms 40, two of which are arranged at the respective opposite lateral surfaces 38 at the axial level of the outflow openings 28. When the deflector element 16 is mounted on the cap 14, the respective adjacent securing arms 40 engage on one side in the two juxtaposed outflow openings 28 so that, in the mounted state, in the axial direction A the central web 48 is located between the securing arms 40.

It would also be imaginable, of course, to expand this concept to three or more juxtaposed outflow openings 28.

In FIG. 8, a unit of a tubular gas generator 12 and an assembly group 10 is shown.

FIG. 8 illustrates how the cap 14 is attached onto and connected to the axial end 22 of the tubular gas generator 12 so that the tubular gas generator 12 and the assembly group 10 form a joint unit.

The same arrangement is also possible with an assembly group 10 according to FIGS. 1 to 7.

Figure 9:
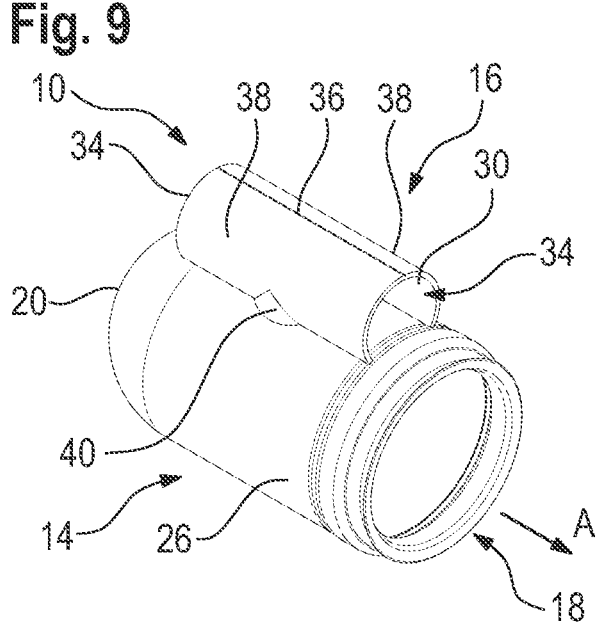
FIG. 9 shows the assembly group of FIG. 8 in a schematic perspective view.
Figure 10:
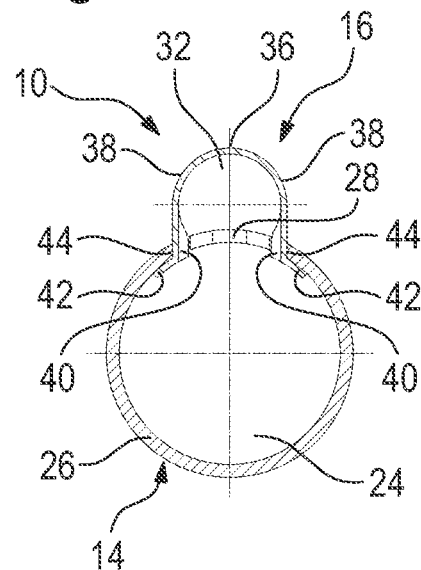
FIG. 10 shows the assembly group of FIG. 9 in a schematic cross-sectional view.
Figure 11:
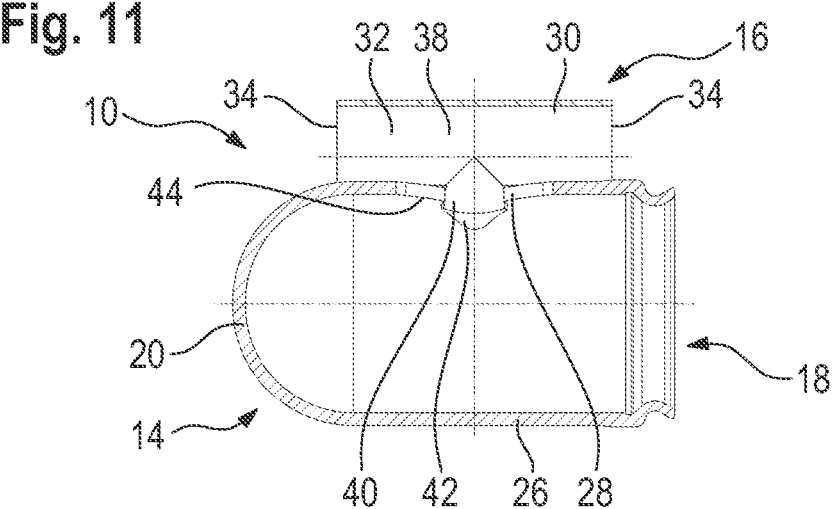
FIG. 11 shows the assembly group of FIG. 9 in a schematic longitudinal section.
Figure 12:
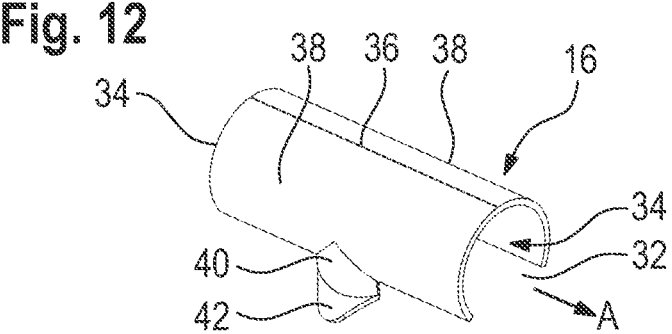
FIG. 12 shows the deflector element of the assembly group of FIG. 9 in a schematic perspective view.

FIGS. 9 to 11 illustrate the assembly group 10 according to a second exemplary arrangement, the deflector element 16 being inserted in the outflow opening 28 of the cap 14.

In contrast to the first exemplary arrangement, the deflector element 16 is fixed to the edge 44 of the outflow opening 28 by a bayonet lock.

For this purpose, the securing arms 40 are selected to be narrower in the axial direction A than in the first exemplary arrangement, and are in particular the same length or narrower than a short side of the outflow opening 28. Moreover, the bent free ends 42 are rounded.

In general, the deflector element 16 may be more rigid than in the first exemplary arrangement. In particular, a resilient bias as in the first exemplary arrangement is not required here.

For assembly, the deflector element 16 is initially rotated by 90° vis-à-vis the axial direction A so that the free ends 42 of the two securing arms 40 can be inserted into the outflow opening 28 from outside the cap 14 without major deformation of the deflector element 16, if possible. Then the deflector element 16 is rotated by 90° so that the crown line 36 is oriented in the axial direction A. Accordingly, the bent free ends 42 contact the circumferential wall 26 of the cap 14 on the inside and engage behind the edge 44 of the outflow opening 28.

In the assembled state, the deflection surface 30 of the deflector element 16 and the cavity 32 below extend, as in the first exemplary arrangement, along the axial direction A radially above the outflow opening 28.

Generally, all concepts shown here can be easily combined with each other at the skilled person's discretion. For example, a filter 46 can be used with all deflector elements 16. It is also possible to select, for each of the shown deflector elements, a different cross-sectional area of the discharge openings 34 or to vary the direction thereof with respect to the axial direction A.

The invention claimed is:

1. An assembly group comprises a cap of a tubular gas generator and a deflector element that deflects gas flowing out of at least one outflow opening of the cap to at least one discharge opening of the deflector element, wherein a deflection surface of the deflector element is arranged radially outwardly of the outflow opening and at least two securing arms of the deflector element extend through the outflow opening and engage behind an edge defining the outflow opening in a positive connection with the cap on the inside.

2. The assembly group according to claim 1, wherein free ends of the securing arms are bent and are adjacent to the edge of the outflow opening on an inner face of a wall of the cap.

3. The assembly group according to claim 1, wherein the deflection surface is curved or grooved.

4. The assembly group according to claim 1, wherein the deflector element is made from a formed sheet metal.

5. The assembly group according to claim 1, wherein the securing arms are biased so as to extend away from each other against the edge of the outflow opening and/or act upon the latter.

6. The assembly group according to claim 1, wherein a filter is interposed between the at least one outflow opening of the cap and the at least one discharge opening of the deflector element.

7. A tubular gas generator comprising at least one gas outlet opening provided at an axial end and an assembly group according to claim 1, wherein the cap is fixed to the tubular gas generator while the cap encompasses the axial end, and a collecting chamber is formed between the at least one gas outlet opening and the cap through which the gas flows toward the deflector element.

8. The assembly group according to claim 1, wherein the cap surrounds a diffusor at a distance.

9. The assembly group according to claim 1, wherein lateral sides on both sides of the securing arms are formed into a circumferentially closed tube, wherein a cavity of the deflector element is convexly curved as a whole away from a circumferential wall of the cap.

10. The assembly group according to claim 1, wherein the positive connection is a click-lock and/or a bayonet lock.

11. The assembly group according to claim 10, wherein the securing arms are biased so as to extend away from each other against the edge of the outflow opening and/or act upon the latter.

12. The assembly group according to claim 1, wherein lateral faces of the deflection surface extend on both sides of a crown line of the deflection surface, the crown line extending in an axial direction of the cap.

13. The assembly group according to claim 12, wherein the lateral faces merge into the securing arms.

14. The assembly group according to claim 1, wherein two outflow openings are separated from each other by a central web and the deflector element includes at least four securing arms, wherein two adjacent securing arms act on both sides of the central web upon the edge of the respective outflow opening.

15. The assembly group according to claim 14, wherein the securing arms are biased so as to extend away from each other against the edge of the outflow opening and/or act upon the latter.

16. A method for manufacturing a tubular gas generator, comprising the following steps:
    firmly fixing a cap to an axial end of the tubular gas generator,
    sliding a deflector element from an outer side of the cap with securing arms of the deflector element through an outflow opening of the cap,
    wherein the securing arms form a positive connection with an edge of the outflow opening which fixes the deflector element firmly to the cap.

17. The method according to claim 16, wherein the securing arms are initially moved toward each other, before the securing arms are slid into the outflow opening, by application of force while being elastically deformed, and wherein the force is removed from the securing arms such that the securing arms spring apart.

18. The method according to claim 16, wherein the securing arms are initially moved into a first orientation and slid into the outflow opening and then the securing arms are subsequently rotated by a predetermined angle into a second orientation while forming a bayonet lock.

19. An assembly group comprises a cap of a tubular gas generator and a deflector element that deflects gas flowing out of at least one outflow opening of the cap to at least one discharge opening of the deflector element, wherein a deflection surface of the deflector element is arranged radially outwardly of the outflow opening and at least two securing arms of the deflector element extend through the outflow opening and engage behind an edge defining the outflow opening in a positive connection with the cap on the inside; wherein the deflector element has an elongate shape and is open at both axial ends so that a discharge opening is formed at each of the axial ends.

20. The assembly group according to claim 19, wherein cross-sectional areas of the two discharge openings are different.

* * * * *